T. CHOPE.
Thill-Coupling.
No. 14,443.
Patented Mar. 18, 1856.
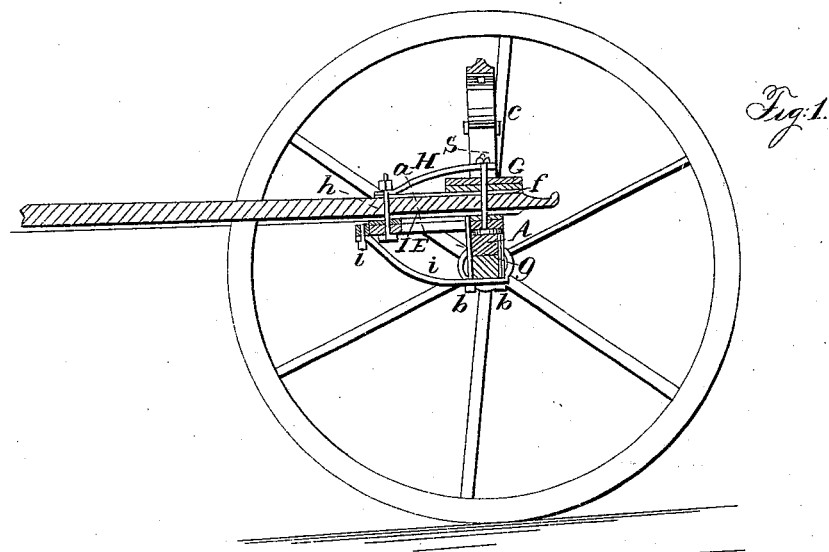
Fig. 1.
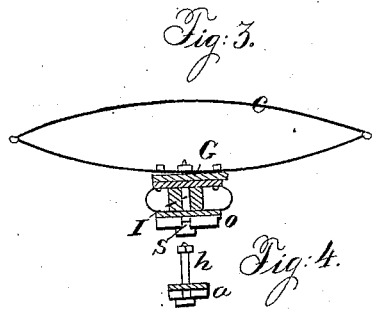
Fig. 3.
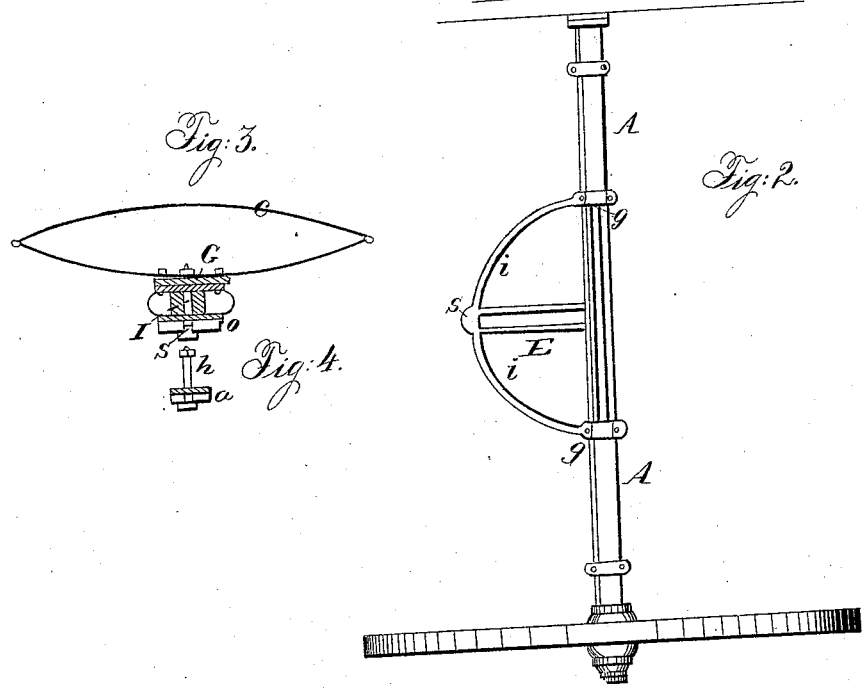
Fig. 2.
Fig. 4.

UNITED STATES PATENT OFFICE.

THOMAS CHOPE, OF DETROIT, MICHIGAN.

CARRIAGE-COUPLING.

Specification of Letters Patent No. 14,443, dated March 18, 1856.

*To all whom it may concern:*

Be it known that I, THOMAS CHOPE, of Detroit, in the county of Wayne and State of Michigan, have invented a new and useful Improvement in Vehicles, and do hereby declare that the following is a full, clear, and exact description of the same, reference being had to the annexed drawings, making a part of this specification, in which—

Figure 1 is a longitudinal vertical section of the front part of the running gear of a vehicle with my improvement applied to it. Fig. 2 is a detached plan or top view of the front axle, and the slotted T shaped bar attached to the axle. Fig. 3 is a front view of the front slide, bolt, perch, and the usual fifth wheel. Fig. 4 is the back slide which works in the back part of the T shaped bar.

Similar letters of reference indicate corresponding parts in the several figures.

The nature of my invention consists in the peculiar mode of attaching the perch of vehicles to the front axle.

To enable others skilled in the art to fully understand and construct my invention I will proceed to describe it.

A, represents the front axle of vehicle.

E, represents the slotted T shaped bar through which the bolt $f$ passes through the slide O, as clearly shown in Figs. 1 and 3, and through the perch I, fifth wheel G, and spring C, with a head on the bottom of the slotted bar E, as clearly shown Fig. 1, which holds them firmly together when the nut $s$ is screwed firmly down, as clearly shown in Fig. 1.

$g$ $g$ are the clips which fasten the slotted T to the axle, axle being of the usual construction as clearly shown in Figs. 1 and 2.

I is the perch, $a$, is the slide; $h$, is the bolt which passes through the slide, $a$, perch, I, and brace, H, as clearly shown in Figs. 1 and 4.

$i$ is a brace from the back of the slotted T to the bottom of the front axle A, and fastened by the clips, $g$, $g$, and nuts $b$ $b$, as clearly shown in Figs. 1 and 2; $p$ shows the bolt which fastens the brace to the back of the slotted T; C represents the spring as clearly shown in Figs. 1 and 3.

The turning of a vehicle with this improvement is easier accomplished as there is only five inches bearing which greatly reduces the amount of friction, also keeping the bearing continually on the axle, making less rock, or tip, to the body of a vehicle when turning, and turning in a smaller space, as the slides, $o$ and $a$, Figs. 3 and 4, work with each other as the front gear is turned, throwing the body away from the front wheels.

This invention entirely obviates all king bolt holes either in the front axle or perch which is the present mode of coupling by which considerably weakens it. It only requires an ordinary bolt for this such as are used on other parts of the vehicle.

The invention is simple may be economically applied and adds strength and durability to the vehicle.

Having described my invention what I claim as new and desire to secure by Letters Patent is—

Attaching the perch of a vehicle to the front axle in a manner which will enable it to turn or lock, by means of a slotted T shaped bar E, which is attached to the front axle by means of clips, $g$, and the slides $o$ and $a$ both working in the slots at right angles as clearly shown in Fig. 2, substantially as shown and described.

THOS. CHOPE.

In presence of—
HENRY CHASE,
WM. LANGLEY.